(12) United States Patent
Nakamura

(10) Patent No.: US 6,909,802 B2
(45) Date of Patent: Jun. 21, 2005

(54) IMAGE-CORRESPONDENCE POSITION DETECTION DEVICE, DISTANCE MEASURING DEVICE AND APPARATUS USING THE SAME

(75) Inventor: Kenji Nakamura, Sakai (JP)

(73) Assignee: Minolta Co., Ltd., Osaka (JP)

( * ) Notice: Subject to any disclaimer, the term of this patent is extended or adjusted under 35 U.S.C. 154(b) by 597 days.

(21) Appl. No.: 09/859,103

(22) Filed: May 16, 2001

(65) Prior Publication Data

US 2001/0055418 A1 Dec. 27, 2001

(30) Foreign Application Priority Data

May 17, 2000 (JP) ........................................ 2000-144897

(51) Int. Cl.[7] .......................... G06K 9/00; H04N 13/00; H04N 15/00
(52) U.S. Cl. ....................... 382/154; 382/278; 382/276; 382/106; 348/42; 348/43
(58) Field of Search ................................ 382/154, 276, 382/278, 106, 284, 294, 209; 348/42, 43, 54; 396/377, 149; 250/559.19; 356/3, 3.1

(56) References Cited

U.S. PATENT DOCUMENTS 5,768,404 A * 6/1998 Morimura et al. .......... 382/107
5,867,591 A * 2/1999 Onda .......................... 382/154
6,021,209 A * 2/2000 Hirabayashi et al. ....... 382/103

FOREIGN PATENT DOCUMENTS

JP              10-026526 A        1/1998

* cited by examiner

Primary Examiner—Bhavesh M. Mehta
Assistant Examiner—John Strege
(74) Attorney, Agent, or Firm—Sidley Austin Brown & Wood LLP (57) ABSTRACT

An image-correspondence position detection device comprising an extractor 12 for extracting a sampling image of specific size from a pair of images, correlation calculator 114 for generating a correlation value line and calculating an integer correlation position and a decimal correlation position while sequentially shifting the extraction position, measured correlation value calculator 118 for calculating a measured correlation value for a partial area at the integer correlation position, estimated correlation value calculator 116 for calculating an estimated correlation value assuming uniform shifting in each pixel of similar sampling images by the difference between the integer correlation position and the decimal correlation position for the partial area, and a correspondence degree calculator 120 for calculating the degree of correspondence between pixels in the partial area from the measured correlation value and the estimated correlation value.

15 Claims, 5 Drawing Sheets

IMAGE-CORRESPONDENCE POSITION DETECTION DEVICE, DISTANCE MEASURING DEVICE AND APPARATUS USING THE SAME

This application is based on Patent Application No. 2000-144897 filed in Japan, the content of which is hereby incorporated by reference.

BACKGROUND OF THE INVENTION

1. Field of the Invention

The present invention relates to an image-correspondence position detection device and a distance measuring device provided with same. The present invention further relates to an image-correspondence position detection device or apparatus provided with a distance measuring device such as, for example, a still camera, movie camera, three-dimensional measuring device and the like.

2. Description of the Related Art

Conventionally, non-TTL type passive distance measuring devices for measuring the distance to an object based on the triangulation principle have been realized by combining a pair of optical systems and a pair of image sensors. This principle measures the mutual correspondence position of images formed on a pair of sensors, and converts this position to a distance. In order to measure the correspondence position, the output of a specific plurality of pixels must be sampled from the output of each sensor, and the degree of mutual correspondence of the sampled outputs must be measured.

Figure 1:
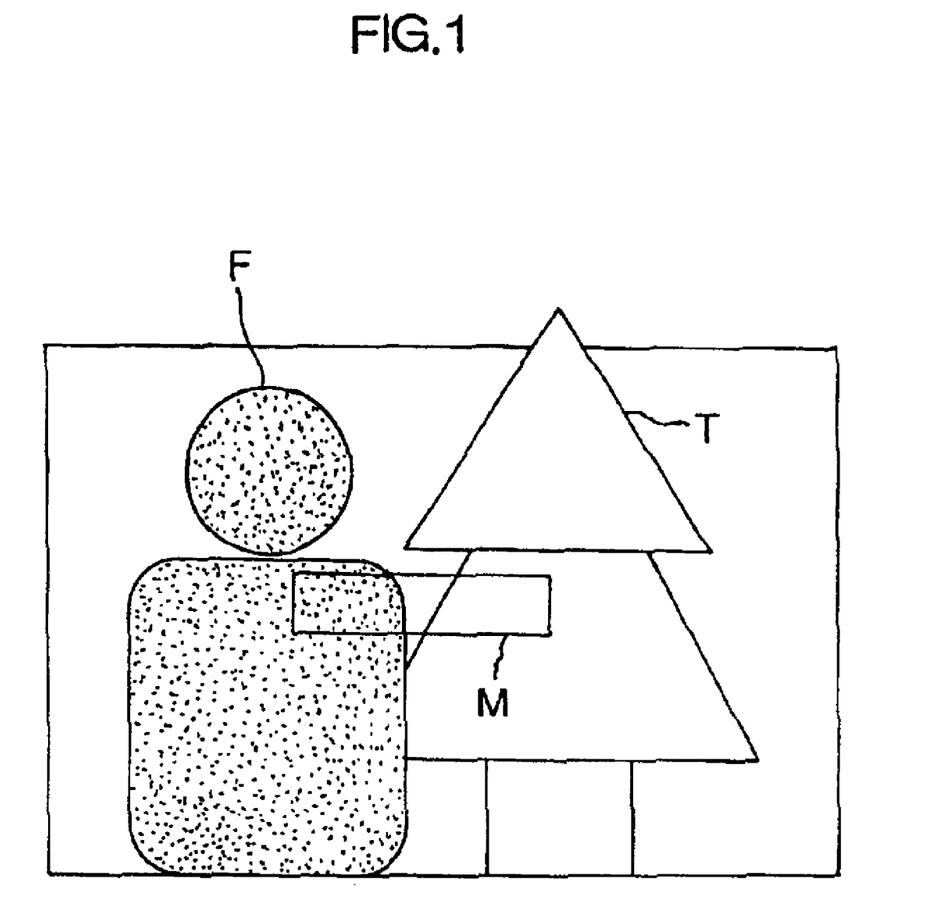
FIG. 1 illustrates objects at different distances.

On the other hand, when two or more objects F and T having different distances within a distance measuring area M are included, as in the example shown in FIG. 1, the output of each sensor changes in accordance with contrast and distance of the object F and T, and the image size ratio within the measurement area M. As a result, a value mixing the object distances of objects F and T, i.e., a completely erroneous value is obtained as the distance measurement data.

There are methods for evaluating the degree of correspondence using a specific evaluation value such as minimum correlation value (Ym) or a ratio of minimum correlation value and contrast (Ym/C) so as to prevent this situation. However, the degree of correspondence can be obtained only for the entire distance measurement area.

Furthermore, even when the distance measurement data more or less accurately represent the distance of one or another among a plurality of objects, it cannot be known for which part within the distance measurement area the distance is representative.

Therefore, the mutual boundaries of objects necessitated when trying to recognize the shape of the object cannot be accurately recognized.

SUMMARY OF THE INVENTION

Accordingly, an object of the present invention is to provide an image-correspondence position detecting device and distance measuring device provided with same capable of accurately recognizing the boundaries of objects. A further object is to provide apparatuses having these devices.

In order to attain these objects it is necessary to examine the degree of correspondence between optional pixel outputs included in a pair of images constructed by the output of a plurality of pixels.

One aspect of the present invention is an image-correspondence position detecting device comprising an extractor, correlation calculator, correspondence degree calculator, measured correlation value calculator, estimated correlation value calculator, and correspondence degree calculator.

The extractor samples image data of specific size from a pair of images to obtain a sample image.

The correlation calculator creates a correlation value row by calculating correlation values representing the degree of correspondence between a pair of sample images while sequentially shifting the sampling position from at least one of the images. Then, the correlation calculator calculates the minimum or maximum positions of correspondence values among the correlation value line, i.e., an integer correspondence position representing a sampling position of optimum degree of correspondence. The correlation calculator interpolates between the correlation values and calculates a minimum value or maximum value, i.e., a decimal correspondence position expressed in units smaller than the magnitude of the pixel of the sampling position having the optimum degree of correspondence.

The measured correlation value calculator calculates the measured correlation value of a partial correlation value for an optional partial area, which is an area corresponding to each sampling image at the integer correspondence position smaller than the sampling image.

The estimated correlation value calculator calculates an estimated correlation value of a partial correlation value from the difference between the integer correspondence position and the decimal correspondence position in the partial area based on the assumption that each sampling image is uniformly shifted in each pixel.

The correspondence degree calculator calculates the degree of correspondence between optional pixels in the partial area from the measured correlation value and the estimated correlation value.

According to this construction, the degree of correspondence of a partial area is calculated for a sampling image at the integer correspondence position from the measured correlation value and the estimated correlation value of the partial area parts of adequate degree of correspondence and parts of poor degree of correspondence within the sampling image can be discriminated by setting the partial area suitably relative to the sampling image.

Accordingly, the boundaries of an object can be accurately recognized.

Another aspect of the present invention is the construction of a distance measuring device using the image-correspondence position detecting device described above.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

The embodiments of the present invention are described hereinafter with reference to the accompanying drawings.

Figure 7:
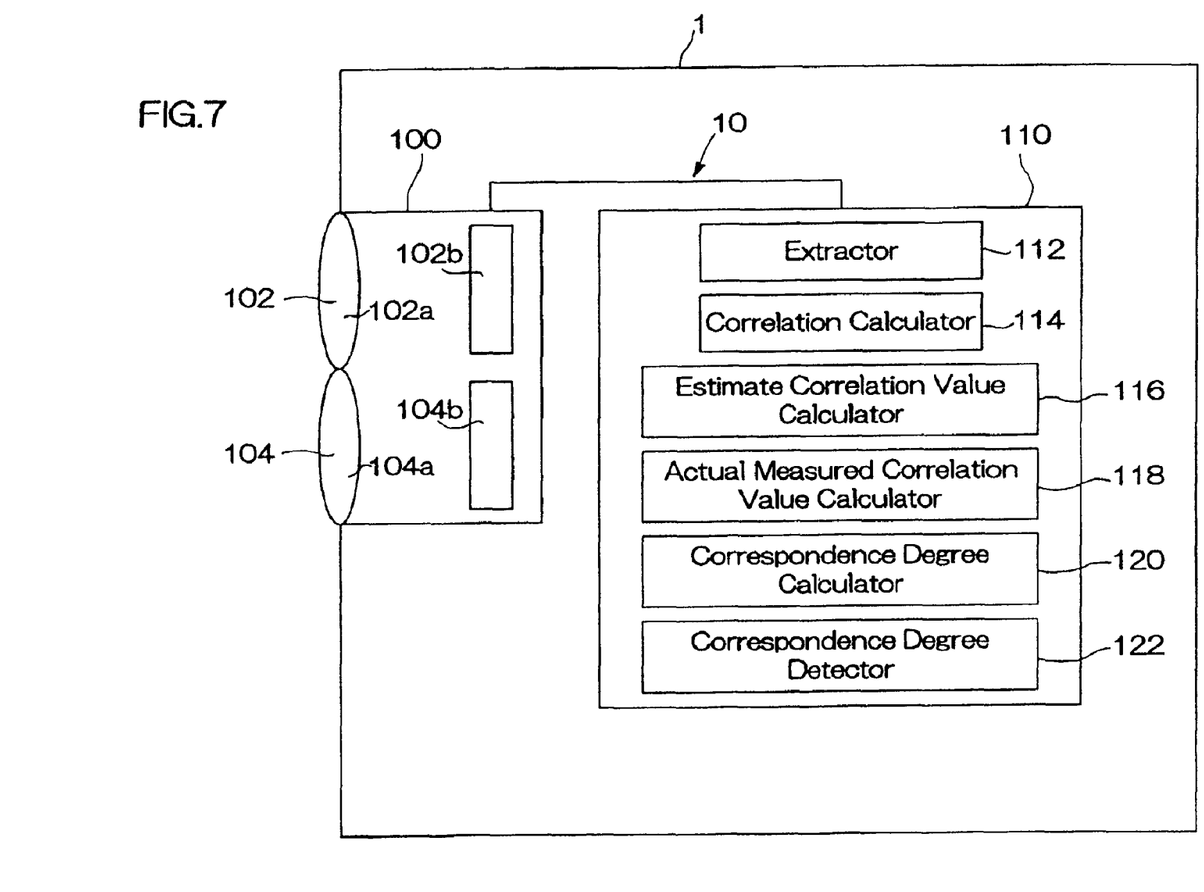
FIG. 7 is a block diagram of a camera provided with the distance measuring device.

As shown in FIG. 7, a distance measuring device 10 is included in a camera 1, and is provided with a distance measuring section 100 and a calculator 110.

The distance measuring section 100 has a pair of sensor units 102 and 104. Each sensor unit 102 and 104 respectively include optical systems 102a and 104a, and image sensing elements 102b and 104b. The optical systems 102a and 104a form object image within the distance measurement area. The image sensing elements 102b and 104b are arranged at the approximate image forming position of the optical systems 102a and 104a, and output data relating to the object image to the calculator 110. The image sensing elements 102b and 104b are typical line sensors, although area sensor also may be used.

The distance measuring device 10 is basically a well-known non-TTL type passive distance measuring device, and calculates the distance to an object by the triangulation principle based on the relative shift amount of the object images of the same part of the object on the image sensing elements 102b and 104b.

Figure 2A:
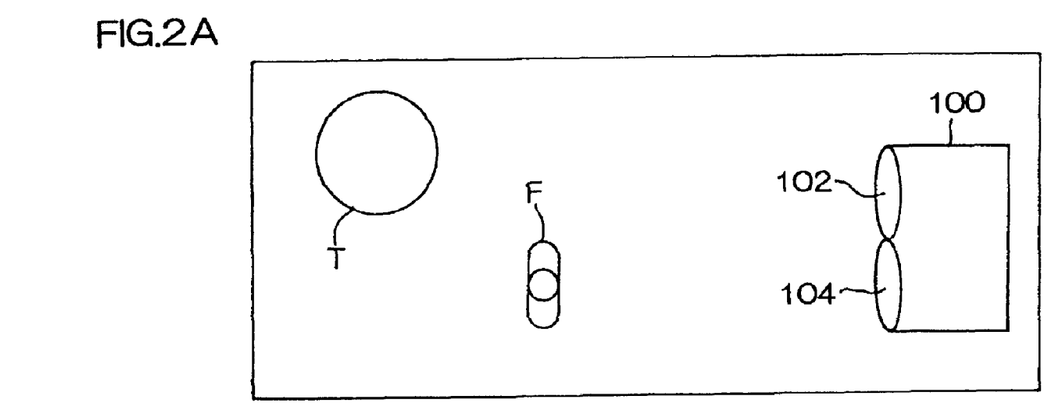
FIGS. 2A through 2C illustrate objects at different distances.
Figure 2B:
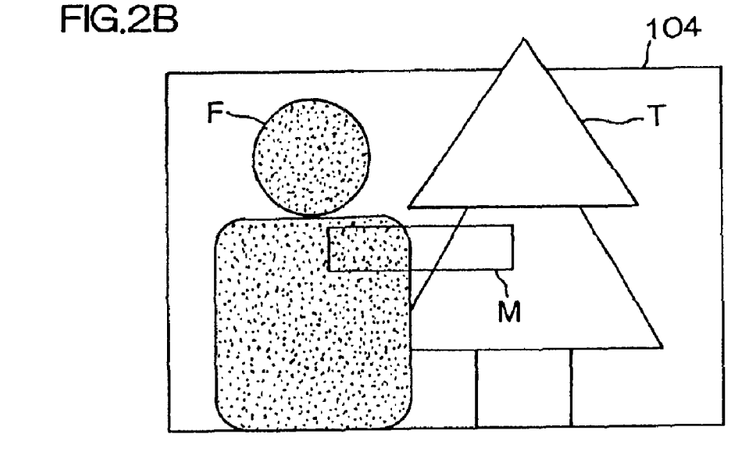
Figure 2C:
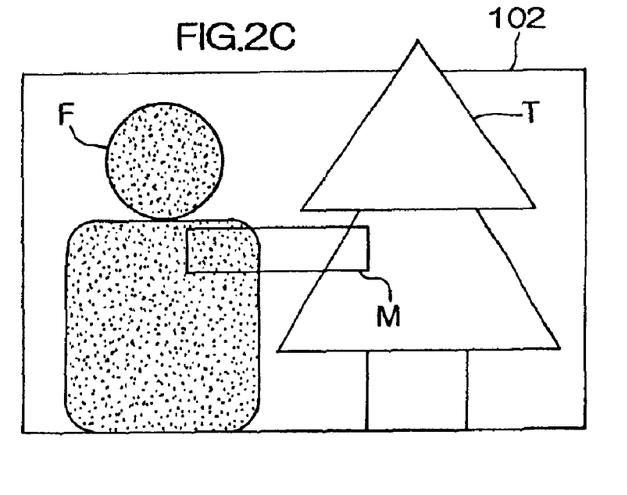

Parallax occurs because the left sensor unit 104 and a right sensor unit 102 of the distance measuring device 10 have different optical axes to capture the object. For this reason when measuring two objects F and T which are different distances from the distance measuring device 10, e.g., as shown in the schematic drawing viewed from the front in FIG. 1 and the schematic drawing viewed from the top in FIG. 2A, the positional relationship of the two objects F and T on the sensor surface becomes as shown in FIG. 2B for the left sensor unit 104 and as shown in FIG. 2C for the right sensor unit 102, such that the positions of the objects F and T appear to be different in the distance measuring area M.

The calculator 110 comprises a microprocessor, memory and the like, and functions as an extractor 112, correlation calculator 114, estimated correlation value calculator 116, measured correlation value calculator 118, correspondence degree calculator 120, and correspondence degree deciding device 122, as shown in FIG. 7.

All functions need not be realized by the microprocessor, and at least part of the functions may be realized by other circuits. Furthermore, a single function may be accomplished by a plurality of circuits, or by other circuits working jointly with the microprocessor.

Figure 3A:
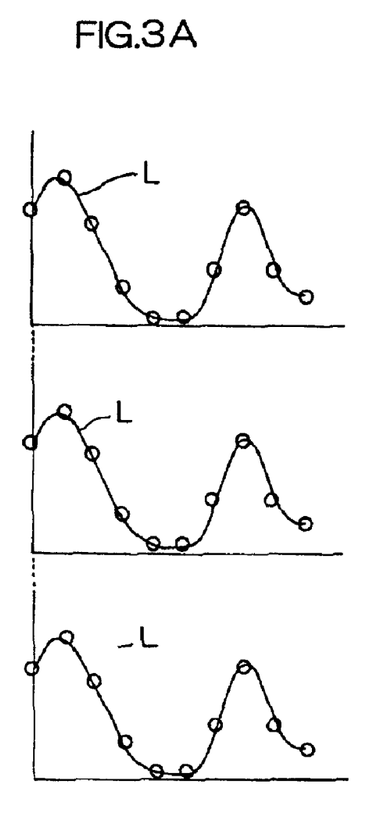
FIGS. 3A and 3B illustrate image sampling.
Figure 3B:
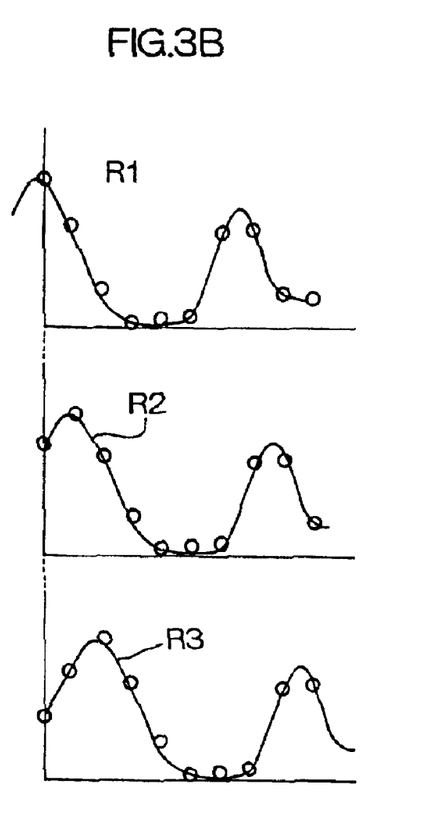
Figure 4:
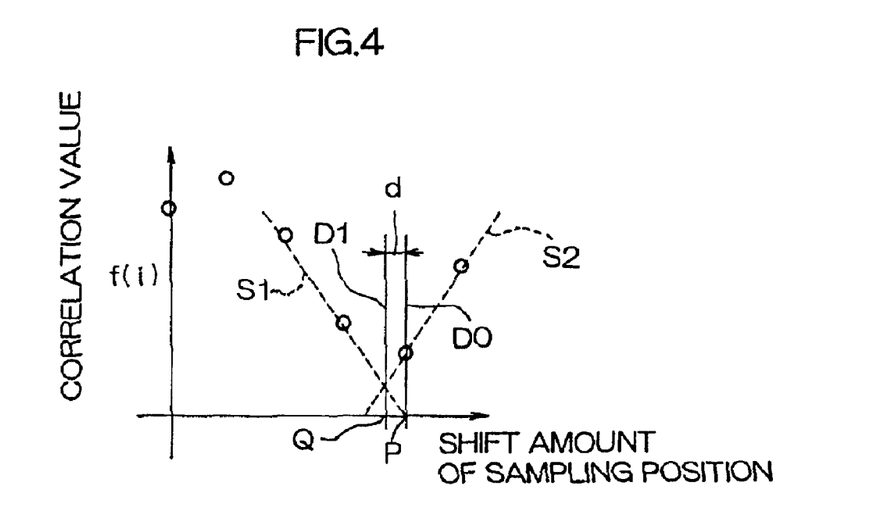
FIG. 4 illustrates a correlation value line.

The extractor 112 extracts rows of data of identical numbers of pixels, i.e., sampling images from data of an object image sensed by the left and right sensor units 104 and 102. The correlation calculator 114 adds the absolute value of the differences between corresponding pixels and calculates the correlation value line f(i) for two extracted data rows. As shown in FIGS. 3A, 3B, and 4, the extractor 112 varies the data extraction position of the right sensor unit 102, and the correlation calculator 114 calculates the correlation value f(i) when the data row L of the standard section sensed by the left sensor unit 104 is fixed and the data rows R1, R2, R3 of the reference section sensed by the right sensor unit 102 are sequentially shifted, and an integer correspondence position P, a decimal correspondence position Q, and a decimal value d at which the correlation value f(i) is minimum are determined. The decimal correspondence position Q is determined by a well-known interpolation method.

In this way sampling positions are determined which well match the entirety of the sampling images.

Figure 5A:
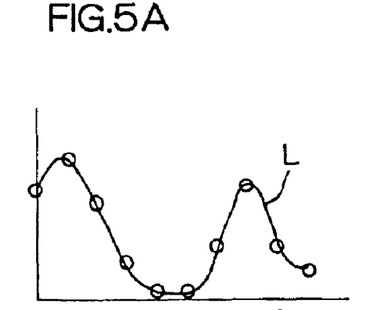
FIGS. 5A through 5C illustrate degree of correspondence.
Figure 5B:
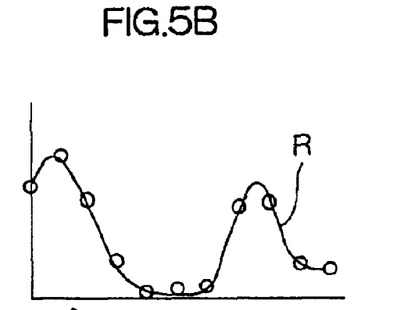
Figure 5C:
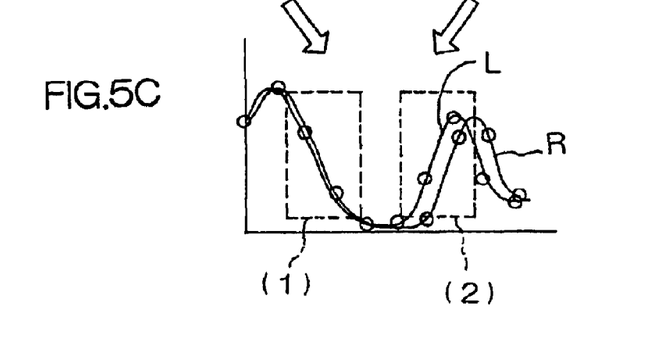

FIGS. 5A and 5B are data rows at the integer correspondence position P having the smallest correlation value F(i), that is, correspondence degree is high, and FIG. 5C is an overlay of these data rows. Due to the influence of parallax between the left and right sensor units 104 and 102, the degree of correspondence of the left and right images is low in the area (2) compared to the area (1) as shown in FIG. 5C. The degree of correspondence can be quantitatively evaluated by calculating an estimated correspondence value using the estimated correspondence value calculator 116 for a small area within the sampling image, calculating the measured correlation value using the measured correlation value calculator 118, calculating the difference between the estimated correlation value and the measured correlation value using the correlation degree calculator 120, and comparing this difference to a specific value to determine the degree of correspondence using the correspondence degree determining device 122.

Figure 6A:
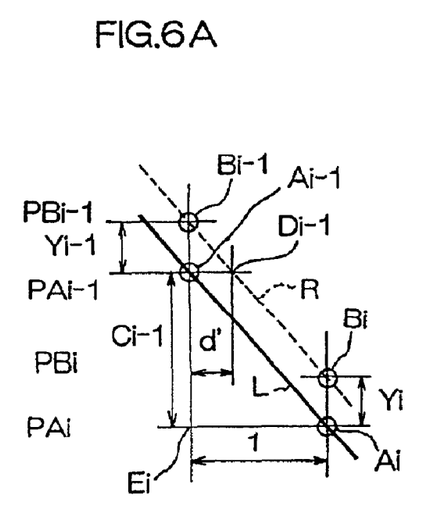
FIGS. 6A and 6B are enlargements of areas (1) and (2) in FIG. 5C.

FIG. 6A shows an enlargement of area (1) of FIG. 5C.

Points $A_{i-1}$, and $A_i$ are the (i−1)-th and i-th data points on the extracted data row L of the standard section, i.e., left sensor unit 104. The respective luminance data are designated $PA_{i-1}$ and $PA_i$, and $C_{i-1} = |PA_{i-1} - PA_i|$, i.e., $C_i = |PA_i - PA_{i+1}|$.

Points $B_{i-1}$ and $B_i$ are the (i−1)-th and i-th data points on the extracted data row R of the reference section, i.e., right sensor unit 102. The respective luminance data are designated $PB_{i-1}$ and $PB_i$, and $Y_{i-1} = PB_{i-1} - PA_{i-1}$, i.e., $Y_i = PB_i - PA_i$.

In FIG. 6A, when line $A_{i-1}A_i$ and line $B_{i-1}B_i$ are approximated as parallel, the triangle $A_{i-1}B_{i-1}D_{i-1}$ and the triangle $E_iA_{i-1}A_i$ have a relationship of similarity, so as to satisfy the relation below.

$$C_{i-1}/1 = Y_{i-1}/d' \qquad \text{(a)}$$

Assuming that the images of the left and right sensor units 104 and 102 are completely identical in shape and the images are shifted in a uniform distance d, a relationship identical to that described above is realized between the points $B_{i-1}'$ and $B_i'$ on the hypothetical data row R' of the reference section corresponding to the points $A_{i-1}$ and $A_i$ on the data row L of the standard section, d' is expected to be the uniform decimal value d determined by the interpolation calculation. When the luminance data of the point $B_{i-1}'$ is designated $PB_{i-1}'$, and $Y_i' = PB_{i-1}' - PA_{i-1}$, the relationship below is satisfied.

$$C_{i-1}/1 = Y_{i-1}'/d \qquad \text{(b)}$$

From the equation the following relationship is derived.

$$Y_{i-1}' = C_{i-1} \cdot d \qquad \text{(c)}$$

$Y_{i-1}'$ is referred to as the estimated correlation value.

The value $Y_i$ can be simply determined from the actual image data. This value $Y_i$ is referred to as the measured correlation value.

If $Y_i$ and $Y_i'$ are compared, it represents the degree of correspondence of the left and right images at that pixel position.

For example, the degree of correspondence can be represented by the absolute value of the difference between the measured correlation value $Y_i$ and the estimated correlation value $Y_i'$, that is, the following relationship obtains.

$$dY_i=|Y_i-Y_i'| \tag{d}$$

This equation expresses whether or not d and d' are equal.

Figure 6B:
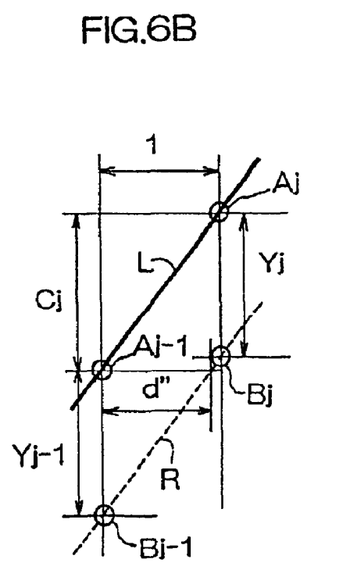

FIG. 6B is an enlargement of area (2) of FIG. 5C, and a relationship identical to that described above is established. That is, the degree of correspondence can be represented by the following equation.

$$dY_j=|Y_j-Y_j'| \tag{d'}$$

This equation expresses whether or not d and d" are equal.

According to the examples of FIGS. 5C, 6A and 6B, since d=d' in area (1), it is clear from the principle that $dY_i=0$. Since d≠d" in area (2), $dY_j≠0$.

Actually, the influence of noise and the like in an image is mitigated by adding $dY_i$ across the periphery of a plurality of pixels, so as to calculate a more accurate degree of correspondence.

That is, since a better match is attained the smaller the difference between the measured correlation value and the estimated correlation value, the degree of correspondence can be determined in pixel units by comparing the difference between the measured correspondence value and the estimated correspondence value to a specific value.

As a modification, the degree of correspondence calculated as $C_i=|PA_i-PA_{i+1}|$ may instead be calculated as $C_i=|PA_{i-1}-PA_{i+1}|/2$, or $C_i=|(PA_{i-1}-PA_{i+1})/2+(PB_{i-1}-PB_{i+1})/2|/2$.

This degree of correspondence may be used to determine the level of correspondence of each pixel, and if this degree of correspondence is added across the entirety of the distance measurement area and the sum is divided by the contrast added across the entirety of the distance measurement area, it becomes the level of correspondence of the entirety of the distance measurement area, i.e., the evaluation value of the reliability of the distance measurement area. In this way even when the contrast is comparatively low, it is possible to detect the level of correspondence of the entire distance measurement area.

The correspondence degree determining device 122 determines the distance is measurable when the reliability evaluation value is less than a specific value, and determines the distance measurement area is unmeasurable when the reliability evaluation value is greater than a specific value.

When the distance is measurable, the data (shift amount of the sampling image) of the distance measurement area are used to measure the distance. At this time, the correspondence degree determining device 122 determines whether or not the measurement data are correct by comparing the degree of correspondence of each pixel to a specific value.

As described above, the distance measuring device 10 is capable of detection each part of an object image even when the true measurement value is different one among the each part by method of comparing the reproduction of the correlation value from the contrast of an object using a determined distance value, and a reproduction of the actual correlation value.

The present invention is not limited to the previously described embodiments, and may be realized in various other modes. For example, the defining equation for quantifying the degree of correspondence may be the opposite of the previously described embodiment describing the relationship of a good/poor degree of correspondence and the magnitude of a numerical value of the degree of correspondence.

As described in the above, the image-correspondence position detecting device comprises an extractor, correlation calculator, correspondence degree calculator, measured correlation value calculator, estimated correlation value calculator, and correspondence degree calculator.

The extractor samples image data of specific size from a pair of images to obtain a sample image.

The correlation calculator creates a correlation value row by calculating correlation values representing the degree of correspondence between a pair of sample images while sequentially shifting the sampling position from at least one of the images. Then, the correlation calculator calculates the minimum or maximum positions of correspondence values among the correlation value row, i.e., an integer correspondence position representing a sampling position of optimum degree of correspondence. The correlation calculator interpolates between the correlation values and calculates a minimum value or maximum value, i.e., a decimal correspondence position expressed in units smaller than the magnitude of a pixel interval of the sampling position having the optimum degree of correspondence.

The measured correlation value calculator calculates the measured correlation value of a partial correlation value for an optional partial area smaller than the sampling image, that is, an area corresponding to each sampling image at the integer correspondence position.

The estimated correlation value calculator calculates an estimated correlation value of a partial correlation value from the difference between the integer correspondence position and the decimal correspondence position in the partial area based on the assumption that each sampling image is uniformly shifted in each pixel.

The correspondence degree calculator calculates the degree of correspondence between optional pixels in the partial area from the measured correlation value and the estimated correlation value.

According to this construction, the degree of correspondence of a partial area is calculated for a sampling image at the integer correspondence position from the measured correlation value and the estimated correlation value of the partial area. Parts of adequate degree of correspondence and parts of poor degree of correspondence within the sampling image can be discriminated by setting the partial area suitably relative to the sampling image.

Accordingly, the boundaries of an object can be accurately recognized.

As described in the above, the distance measuring device is provided with a pair of optical systems for forming a pair of object images, and a pair of image sensing elements provided near the image forming position of each optical system. The distance measuring device is provided with the previously described image-correspondence position detection device. The image-correspondence position detection device obtains sampling images by extracting the image of the distance detection area allocated to each specific area of a pair of images sensed by the pair of image sensing elements, and calculates an integer correspondence position and a decimal correspondence position.

The distance measuring device discriminates whether the degree of correspondence is good or poor by determining for each pixel the magnitude of a specific value and the degree of correspondence calculated by the image-correspondence position detection device and the distance data calculator which calculates the distance of the distance detection area from the integer correspondence position and the decimal correspondence position. Then, if the value represents a poor degree of correspondence, the pixel is unmeasurable, and if the value represents a good degree of correspondence, the distance measurement data of the distance measurement area are used as the pixel measurement data by the detector.

According to this construction, when a plurality of objects having different distances within the distance detection area, whether or not the distance data of the distance detection area represent a distance corresponding to one of the objects can be discriminated by calculating the degree of correspondence of pixels within the distance detection area.

For a pair of images a plurality of distance detecting areas are provided, and at least part of the pixels included in the pair of images overlap a plurality of distance detecting areas. The distance data is set for optional pixels included in the overlapping plurality of distance detecting areas based on the degree of correspondence determined as "good" among the degrees of correspondence obtained from the plurality of distance detecting areas.

In this construction, the distance detecting areas are arranged so as to overlap. The distance data of optional pixels arranged so as to overlap can be accurately set based on the degree of correspondence obtained from the plurality of distance detecting areas including the pixel.

The distance data of the optional pixel are distance data pertaining to a distance measuring area having the best degree of correspondence among the degrees of correspondence obtained from a plurality of distance measuring areas determined to have good degrees of correspondence for that pixel.

With regard to the optional pixel, when the degrees of correspondence obtained from a plurality of distance measuring areas are mutually different, the distance data can be set with the most accuracy by using the distance data having the best degree of correspondence for that pixel.

As described in the above, the image-correspondence position detection device extracts data of images A' and B' while sequentially shifting the sampling position of at least an image B among a pair of images A and B comprising a plurality of pixel rows arranged unidimensionally, and calculates the correlation values of only a specific number of samples to generate a correlation value line f(j). Then, a decimal value d between pixels is determined by interpolating the sampling position of the image having the highest correlation from the generated correlation value line f(j). The image-correlation position detection device is provided with an image correlation degree calculator for calculating the degree of correlation $dY_i$ of optional pixels in images A' and B' by the method described below.

$$dY_i = |Y_i - Y_i'| \quad (1)$$

$$Y_i = PA_i - PB_i \quad (2)$$

$$Y_i' = C_i \times \delta \quad (3)$$

$$\delta = d \text{ (where } d \leq 0.5\text{) or } 1-d \text{ (where } d > 0.5\text{)} \quad (4)$$

$$C_i = |PA_i - PA_{i+1}| \quad (5)$$

$PA_i$ and $PB_i$ are data of the number i optional pixels of A' and B' in the combination of A' and B' having the smallest correspondence values f(j).

According to this construction, the degree of correspondence is calculated and quantitatively evaluated for optional pixels of a pair of sampling images by the minimum value of the correlation value line of the sampling images without being limited to the determination of the pair of sampling images having the best correlation.

Accordingly, the boundary of an object can be accurately recognized in pixel units, for example, by comparing the degree of correspondence to a specific threshold value.

In this construction, the degree of correspondence can be defined in various modes. For example, equation (5) above can be replaced by either equation (5a) or equation (5b) below.

$$C_i = |PA_{i-1} - PA_{i+1}|/2 \quad (5a)$$

$$C_i = |(PA_{i-1} - PA_{i+1})/2 + (PB_{i-1} - PB_{i+1})/2|/2 \quad (5b)$$

As described in the above, the image-correspondence position detection device examines the degree of correspondence between optional pixels included in a pair of images comprised of a plurality of pixels.

The image-correspondence position detection device comprises an extractor, correlation value calculator, measured correlation value calculator, estimated correlation value calculator, degree of correspondence calculator, and reliability evaluation value calculator.

The extractor samples image data of specific size from a pair of images to obtain a sample image.

The correlation calculator creates a correlation value line by calculating correlation values representing the degree of correspondence between a pair of sample images while sequentially shifting the sampling position from at least one of the images. Then, the positions of the minimum and maximum correlation values are determined, i.e., the integer correspondence position representing the sampling position having the best degree of correspondence is determined. Finally, interpolation between correlation values is performed, and the sampling positions corresponding to the minimum value and maximum value, i.e., the decimal correspondence positions, are calculated.

The measured correlation value calculator calculates the measured correlation value of a partial correlation value from pixel data of a partial area smaller than the sampling image and including optional pixels among the sampling image in an area mutually corresponding to sampling images at the integer correspondence position.

The estimated correlation value calculator calculates an estimated correlation value of a partial correlation value from the difference between the integer correspondence position and the decimal correspondence position in the partial area based on the assumption that each sampling image is uniformly shifted in each pixel.

The correspondence degree calculator calculates the degree of correspondence between optional pixels in the partial area from the measured correlation value and the estimated correlation value.

The reliability evaluation value calculator calculates a reliability evaluation value for evaluating the reliability of the sampling image at the integer correspondence position from the previously mentioned degree of correspondence and the change in luminance of the object in the sampling image at the integer correspondence position.

The degree of correspondence is the even small change in the value according to the degree of contrast when the contrast influences the sampling image. However, according to this construction, the value of the degree of correspondence is corrected by the contrast value, such that the degree of correspondence between sampling images can be objectively evaluated by the reliability evaluation value which is not affected or only slightly affected by the contrast.

Accordingly, the boundary of the object can be accurately recognized in sampling image units.

As described in the above, the image-correspondence position detection device extracts images A' and B' while sequentially shifting the sampling position of at least an image B among a pair of images A and B comprising a plurality of pixel rows arranged unidimensionally. Then, the correlation values of only a specific number of samples are calculated to generate a correlation value line f(j), and a decimal value d between pixels is determined by interpolating the sampling position of the image having the highest correlation from the generated correlation value line f(j). The image-correlation position detection device is provided with an image correlation degree calculator for calculating a reliability evaluation value SY/C for evaluating the degree of correspondence at the correspondence positions of images A' and B' by the calculations shown below.

$$SY/C = \Sigma |Y_i - Y_i'| / \Sigma C_i \quad (11)$$

$$Y_i = PA_i - PB_i \quad (12)$$

$$Y_i' = C_i \times \delta \quad (13)$$

$$\delta = d \text{ (where } d \leq 0.5\text{) or } 1-d \text{ (where } d > 0.5\text{)} \quad (14)$$

$$C_i = |PA_i - PA_{i+1}| \quad (15)$$

$PA_i$ and $PB_i$ are data of optional number i pixels of images A' and B' in the combination of A', B' having the smallest correlation value f(j).

In equation (11), the two $\Sigma$ are the sum of $i=0, 1, \ldots, Np$, and Np is the number of pixels included in image A'.

According to this construction, an accurate reliability evaluation value unaffected by the contrast of the object can be obtained by adding $|Y_i - Y_i'|$ of the degree of correspondence across the entirety of the pair of sampling images and dividing this value by the contrast $\Sigma C_i$ across the entirety of the sampling area without being limited to determining the pair of sampling areas having the best correspondence by the minimum value of the correlation value line of the sampling images.

Accordingly, even when the contrast is low, the boundary of the object can be accurately recognized in sampling image units.

The reliability evaluation value can be variously defined. For example, equations (15a) and (15b) may be used instead of equation (15).

$$C_i = |PA_{i-1} - PA_{i+1}|/2 \quad (15a)$$

$$C_i = |(PA_{i-1} - PA_{i+1})/2 + (PB_{i-1} - PB_{i+1})/2|/2 \quad (15b)$$

As described in the above, the distance measuring device determines the distance of an object from the correspondence positions of two images formed through two different optical systems. The distance measuring device is provided with the previously described image-correspondence position detection device. A distance measuring area if provided for measuring distance at least two locations on a screen. A reliability evaluation value is calculated for the distance measuring area similar to that of the previously described image-correspondence position detection device. The distance measuring device is provided with a selector for selecting one or more distance measurement areas, or determining not select any distance measurement area based on the calculated reliability evaluation value.

According to this construction when a distance measurement area is selected, the distance of the distance measurement area can be measured by the triangulation principle from positions in two images of the selected distance measurement areas. When none of the distance measurement areas are selected, distance measurement cannot be accomplished for any distance measurement area.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An image-correspondence position detecting device comprising:

an extractor for sampling image data of specific size from a pair of images to obtain a sample image;

a correlation calculator for creating a correlation value row by calculating correlation values representing the degree of correspondence between a pair of sample images while sequentially shifting the sampling position from at least one of the images, and for calculating minimum or maximum positions of correspondence values among the correlation value row which represents an integer correspondence position representing a sampling position of optimum degree of correspondence, and for interpolating between the correlation values and calculates a minimum value or maximum value which represents a decimal correspondence position having the optimum degree of correspondence;

measured correlation value calculator for calculating the measured correlation value of a partial correlation value for an optional partial area smaller than the sampling image, which is an area corresponding to each sampling image at the integer correspondence position;

estimated correlation value calculator for calculating an estimated correlation value of a partial correlation value from the difference between the integer correspondence position and the decimal correspondence position in the partial area based on the assumption that each sampling image is uniformly shifted in each pixel; and correspondence degree calculator for calculating the degree of correspondence between optional pixels in the partial area from the measured correlation value and the estimated correlation value.

2. A distance measuring device comprising:

a pair of optical systems for forming a pair of object images;

a pair of image sensing elements provided near the image forming position of each optical system;

an extractor for sampling image data of specific size from a pair of images on said image sensing elements to obtain a sample image;

a correlation calculator for creating a correlation value row by calculating correlation values representing the degree of correspondence between a pair of sample images while sequentially shifting the sampling position from at least one of the images, and for calculating minimum or maximum positions of correspondence values among the correlation value row which represents an integer correspondence position representing a sampling position of optimum degree of correspondence, and for interpolating between the correlation values and calculates a minimum value or maximum value which represents a decimal correspondence position having the optimum degree of correspondence;

a measured correlation value calculator for calculating the measured correlation value of a partial correlation value for an optional partial area smaller than the sampling image, which is an area corresponding to each sampling image at the integer correspondence position;

an estimated correlation value calculator for calculating an estimated correlation value of a partial correlation value from the difference between the integer correspondence position and the decimal correspondence position in the partial area based on the assumption that each sampling image is uniformly shifted in each pixel;

a correspondence degree calculator for calculating the degree of correspondence between optional pixels in the partial area from the measured correlation value and the estimated correlation value;

a distance calculator for calculating a distance based on the integer correspondence position and a decimal correspondence position; and a discriminator for discriminating whether the degree of correspondence is good or poor by comparing for each pixel a specific value and the degree of correspondence, so that if the degree is discriminated as poor, the pixel is determined unmeasurable, and if the degree is discriminated as good, the distance measurement data is adopted.

3. A distance measuring device according to claim 2, wherein, a plurality of distance detecting areas are provided for the pair of object images, at least part of the pixels included in the pair of images overlap a plurality of the distance detecting areas, and the distance data is determined for optional pixels included in the overlapping distance detecting areas based on the degree of correspondence discriminated as good among the degrees of correspondence obtained from the plurality of distance detecting areas.

4. A distance measuring device according to claim 3, wherein a distance data is obtained based on a distance measuring area having the best degree of correspondence among the degrees of correspondence obtained from a plurality of distance measuring areas determined to have good degrees of correspondence.

5. An image-correspondence position detection device comprising:

an extractor for extracting data of images A' and B' respectively from a pair of images A and B while sequentially shifting the sampling position of at least one image among the pair of images A and B including a plurality of pixel rows arranged unidimensionally;

correlation calculator for calculating correlation values of only a specific number of samples to generate a correlation value row f(j);

an interpolator for obtaining a sampling position having the highest correlation to a decimal value d between pixels by interpolating the correlation values from the generated correlation value row f(j); and an image correlation degree calculator for calculating the degree of correlation dYi of optional pixels in images A' and B' by the following formula, $$dY_i = |Y_i - Y_i'| \quad (1)$$

$$Y_i = PA_i - PB_i \quad (2)$$

$$Y_i' = C_i \times \delta \quad (3)$$

$$\delta = d \text{ (where } d \leq 0.5\text{) or } 1-d \text{ (where } d > 0.5\text{)} \quad (4)$$

$$C_i = |PA_i - PA_{i+1}| \quad (5)$$

where $PA_i$ and $PB_i$ are data of the number i optional pixels of A' and B' in the combination of A' and B' having the smallest correspondence values f(j).

6. An image-correspondence position detection device comprising:

an extractor for extracting data of images A' and B' respectively from a pair of images A and B while sequentially shifting the sampling position of at least one image among the pair of images A and B including a plurality of pixel rows arranged unidimensionally;

correlation calculator for calculating correlation values of only a specific number of samples to generate a correlation value row f(j);

an interpolator for obtaining a sampling position having the highest correlation to a decimal value d between pixels by interpolating the correlation values from the generated correlation value row f(j); and an image correlation degree calculator for calculating the degree of correlation dYi of optional pixels in images A' and B' by the following formula, $$dY_i = |Y_i - Y_i'| \quad (1)$$

$$Y_i = PA_i - PB_i \quad (2)$$

$$Y_i' = C_i \times \delta \quad (3)$$

$$\delta = d \text{ (where } d \leq 0.5\text{) or } 1-d \text{ (where } d > 0.5\text{)} \quad (4)$$

$$C_i = |PA_{i-1} - PA_{i+1}|/2 \quad (5a)$$

where $PA_i$ and $PB_i$ are data of the number i optional pixels of A' and B' in the combination of A' and B' having the smallest correspondence values f(j).

7. An image-correspondence position detection device comprising:

an extractor for extracting data of images A' and B' respectively from a pair of images A and B while sequentially shifting the sampling position of at least one image among the pair of images A and B including a plurality of pixel rows arranged unidimensionally;

correlation calculator for calculating correlation values of only a specific number of samples to generate a correlation value row f(j);

an interpolator for obtaining a sampling position having the highest correlation to a decimal value d between pixels by interpolating the correlation values from the generated correlation value row f(j); and an image correlation degree calculator for calculating the degree of correlation dYi of optional pixels in images A' and B' by the following formula, $$dY_i = |Y_i - Y_i'| \quad (1)$$

$$Y_i = PA_i - PB_i \quad (2)$$

$$Y_i' = C_i \times \delta \quad (3)$$

$$\delta = d \text{ (where } d \leq 0.5\text{) or } 1-d \text{ (where } d > 0.5\text{)} \quad (4)$$

$$C_i = |(PA_{i-1} - PA_{i+1})/2 + (PB_{i-1} - PB_{i+1})/2|/2 \quad (5b)$$

where $PA_i$ and $PB_i$ are data of the number i optional pixels of A' and B' in the combination of A' and B' having the smallest correspondence values f(j).

8. An image-correspondence position detecting device comprising:

an extractor for sampling image data of specific size from a pair of images to obtain a sample image;

a correlation calculator for creating a correlation value row by calculating correlation values representing the degree of correspondence between a pair of sample images while sequentially shifting the sampling position from at least one of the images, and for calculating minimum or maximum positions of correspondence values among the correlation value row which represents an integer correspondence position representing a sampling position of optimum degree of correspondence, and for interpolating between the correlation values and calculates a minimum value or maximum value which represents a decimal correspondence position having the optimum degree of correspondence;

measured correlation value calculator for calculating the measured correlation value of a partial correlation value for an optional partial area smaller than the sampling image, which is an area corresponding to each sampling image at the integer correspondence position;

estimated correlation value calculator for calculating an estimated correlation value of a partial correlation value from the difference between the integer correspondence position and the decimal correspondence position in the partial area based on the assumption that each sampling image is uniformly shifted in each pixel;

correspondence degree calculator for calculating the degree of correspondence between optional pixels in the partial area from the measured correlation value and the estimated correlation value; and a reliability evaluation value calculator for calculating a reliability evaluation value for evaluating the reliability of the sampling image at the integer correspondence position from the degree of correspondence and the change in luminance of the object in the sampling image at the integer correspondence position.

9. A distance measuring device having the image-correspondence position detecting device according to claim 8, comprising:

a selector for selecting one or more distance measurement areas, or determining not to select any distance measurement area based on the calculated reliability evaluation value.

10. An image-correspondence position detection device comprising:

an extractor for extracting data of images A' and B' respectively from a pair of images A and B while sequentially shifting the sampling position of at least one image among the pair of images A and B including a plurality of pixel rows arranged unidimensionally;

correlation calculator for calculating correlation values of only a specific number of samples to generate a correlation value row f(j);

an interpolator for obtaining a sampling position having the highest correlation to a decimal value d between pixels by interpolating the correlation values from the generated correlation value row f(j); and a reliability evaluation value calculator for calculating a reliability evaluation value SY/C for evaluating the degree of correspondence at the correspondence positions of images A' and B' by the following formula, $$SY/C = \Sigma |Y_i - Y_i'| \Sigma C_i \quad (11)$$
$$Y_i = PA_i - PB_i \quad (12)$$
$$Y_i' = C_i \times \delta \quad (13)$$
$$\delta = d \text{ (where } d \leq 0.5\text{) or } 1-d \text{ (where } d<0.5\text{)} \quad (14)$$
$$C_i = |PA_i - PA_{i+1}| \quad (15)$$

where, $PA_i$ and $PB_i$ are data of optional number i pixels of first portions images A' and B' in the combination of A', B' having the smallest correlation value f(j), and where, the $\Sigma$s are the sum of i=0, 1, . . . , Np, and Np is the number of pixels included in image A'.

11. A distance measuring device having the image-correspondence position detecting device according to claim 10, comprising:

a selector for selecting one or more distance measurement areas, or determining not to select any distance measurement area based on the calculated reliability evaluation value.

12. An image-correspondence position detection device comprising:

an extractor for extracting data of images A' and B' respectively from a pair of images A and B while sequentially shifting the sampling position of at least one image among the pair of images A and B including a plurality of pixel rows arranged unidimensionally;

correlation calculator for calculating correlation values of only a specific number of samples to generate a correlation value row f(j);

an interpolator for obtaining a sampling position having the highest correlation to a decimal value d between pixels by interpolating the correlation values from the generated correlation value row f(j); and a reliability evaluation value calculator for calculating a reliability evaluation value SY/C for evaluating the degree of correspondence at the correspondence positions of images A' and B' by the following formula, $$SY/C = \Sigma |Y_i - Y_i'| \Sigma C_i \quad (11)$$
$$Y_i = PA_i - PB_i \quad (12)$$
$$Y_i' = C_i \times \delta \quad (13)$$
$$\delta = d \text{ (where } d \leq 0.5\text{) or } 1-d \text{ (where } d>0.5\text{)} \quad (14)$$
$$C_i = |PA_{i-1} - PA_{i+1}|/2 \quad (15a)$$

where, $PA_i$ and $PB_i$ are data of optional number i pixels of images A' and B' in the combination of A', B' having the smallest correlation value f(j), and where, the $\Sigma$s are the sum of i=0, 1, . . . , Np, and Np is the number of pixels included in image A'.

13. A distance measuring device having the image-correspondence position detecting device according to claim 12, comprising:

a selector for selecting one or more distance measurement areas, or determining not to select any distance measurement area based on the calculated reliability evaluation value.

14. An image-correspondence position detection device comprising:

an extractor for extracting data of images A' and B' respectively from a pair of images A and B while sequentially shifting the sampling position of at least one image among a pair of images A and B including a plurality of pixel rows arranged unidimensionally;

correlation calculator for calculating correlation values of only a specific number of samples to generate a correlation value row f(j);

an interpolator for obtaining a sampling position having the highest correlation to a decimal value d between pixels by interpolating the correlation values from the generated correlation value row f(j); and a reliability evaluation value calculator for calculating a reliability evaluation value SY/C for evaluating the degree of correspondence at the correspondence positions of A' and B' by the following formula, $$SY/C = \Sigma |Y_i - Y_i'| \Sigma C_i \quad (11)$$

$$Y_i = PA_i - PB_i \quad (12)$$

$$Y_i' = C_i \times \delta \quad (13)$$

$$\delta = d \text{ (where } d \leq 0.5\text{) or } 1-d \text{ (where } d > 0.5\text{)} \quad (14)$$

$$C_i = |(PA_{i-1} - PA_{i+1})/2 + (PB_{i-1} - PB_{i+1})/2|/2 \quad (15b)$$

where, $PA_i$ and $PB_i$ are data of optional number i pixels of images A' and B' in the combination of A', B' having the smallest correlation value f(j); and where, the $\Sigma$s are the sum of i=0, 1, ..., Np, and Np is the number of pixels included in image A'.

15. A distance measuring device having the image-correspondence position detecting device according to claim 14, comprising:

a selector for selecting one or more distance measurement areas, or determining not to select any distance measurement area based on the calculated reliability evaluation value.

* * * * *

UNITED STATES PATENT AND TRADEMARK OFFICE
CERTIFICATE OF CORRECTION

PATENT NO. : 6,909,802 B2
DATED : June 21, 2005
INVENTOR(S) : Kenji Nakamura It is certified that error appears in the above-identified patent and that said Letters Patent is hereby corrected as shown below:

Column 15,
Line 9, delete "$Y_i 32\ PA_i\text{-}PB_i$" and insert -- $Y_i = PA_i - PB_i$ --.

Signed and Sealed this

Sixteenth Day of August, 2005

JON W. DUDAS
*Director of the United States Patent and Trademark Office*